United States Patent
Latzina (10) Patent No.: US 10,353,958 B2
(45) Date of Patent: Jul. 16, 2019

(54) DISCRIMINATIVE CLUSTERING

(71) Applicant: SAP SE, Walldorf (DE)

(72) Inventor: Markus Latzina, Wiesenbach (DE)

(73) Assignee: SAP SE, Walldorf (DE)

( * ) Notice: Subject to any disclaimer, the term of this patent is extended or adjusted under 35 U.S.C. 154(b) by 149 days.

(21) Appl. No.: 15/463,903

(22) Filed: Mar. 20, 2017

(65) Prior Publication Data

US 2018/0268082 A1    Sep. 20, 2018

(51) Int. Cl.
*G06F 16/904* (2019.01)
*G06F 16/28* (2019.01)

(52) U.S. Cl.
CPC .......... *G06F 16/904* (2019.01); *G06F 16/287* (2019.01)

(58) Field of Classification Search
CPC .......... G06F 17/30994; G06F 3/04817; G06F 3/0482; G06F 16/906; G06F 16/287
See application file for complete search history.

(56) References Cited

U.S. PATENT DOCUMENTS

| | | | | |
|---|---|---|---|---|
| 5,983,220 A | * | 11/1999 | Schmitt | G06F 17/30398 |
| 2003/0018652 A1 | * | 1/2003 | Heckerman | G06F 17/30713 |
| 2008/0010304 A1 | * | 1/2008 | Vempala | G06F 17/3071 |
| 2010/0010986 A1 | * | 1/2010 | Icho | G06F 17/30058 |
| | | | | 707/E17.014 |
| 2014/0012848 A1 | * | 1/2014 | Denney | G06F 17/30707 |
| | | | | 707/737 |
| 2014/0067614 A1 | * | 3/2014 | Hygema | G06Q 30/0601 |
| | | | | 705/26.63 |
| 2014/0129386 A1 | * | 5/2014 | Ghouri | G06Q 30/0623 |
| | | | | 705/26.61 |
| 2017/0316459 A1 | * | 11/2017 | Strauss | G06Q 30/0255 |

* cited by examiner

*Primary Examiner* — Tadesse Hailu
(74) *Attorney, Agent, or Firm* — Fish & Richardson P.C.

(57) ABSTRACT

A visual analytics system includes a memory and a processor. The processor executes a clustering application having an interactive user-interface rendered on a client computer. The clustering application determines a first cluster of data items of a data set, the data items in the first cluster having first attribute values that are similar to each other within a first degree of similarity and determines a second cluster of data items of the data set, the data items in the second cluster having second attribute values that are similar to each other within a second degree of similarity. For visual analytics, the user interface receives a user selection of a third degree of similarity. In response to which, the clustering application determines a third cluster of data items of the data set, the data items in the third cluster being dissimilar to either the first attribute value of the first reference data item or the second attribute value of the second reference data item by at least the third degree of similarity, and visually displays the third cluster of data items on the user interface.

20 Claims, 11 Drawing Sheets

Query-Building 410

410a Toy
- ☐ (something)
- ⊙ ☐ ⊕

410b Sub
- ☐ (something)
- ⊙ ☐ ⊕

Results 420

| 420a1 Toyota Camry | 420a2 Toyota Camry | 420a3 Toyota Camry | 420b1 Subanru Libert | 420b2 Toyota Camry | 420b3 Toyota Camry | 420b4 Toyota Camry |
|---|---|---|---|---|---|---|
| RZ CA-353 Consumption (l/100km):7, 3 Mileage (km):13038 | JR VK-422 Consumption(l/100km):5,1 Mileage(km):18, 490 | WX HC-256 Consumption(l/100km):8,5 Mileage (km):14,926 | VZ HG-904 Consumption (l/100km):9, 3 Mileage (km):12,201 | EZJO-695 Consumption (l/100km):11,2 Mileage (km):20941 | VW FI-045 Consumption (l/100km):9,4 Mileage (km): 13336 | FLIU-006 Consumption (l/100km):9,3 Mileage (km): 34276 |

DISCRIMINATIVE CLUSTERING

BACKGROUND

Data analytics technologies and techniques are widely used in commercial industries to enable organizations to make more-informed business decisions and by scientists and researchers to verify or disprove scientific models, theories and hypotheses. Specialized computer systems and software can be used to examine data sets in order to draw conclusions about the information they contain. Data in the data sets may be extracted and categorized to identify and analyze data trends and patterns. The data analytics may, for example, involve use of statistical tools (e.g., clustering or partitioning) to group data having similar characteristics or properties in "clusters" as a possible explanation of trends or patterns in data.

The data analytics technologies and techniques provided by these computer systems and software may include provisions for visual analytics i.e. analytical reasoning facilitated by interactive visual interfaces. Visual analytics can be used to attack certain problems whose size, complexity, and need for closely coupled human and machine analysis may make them otherwise intractable.

Consideration is now being given to systems and techniques for human-computer interaction in the context of data analytics. In particular, attention is directed toward interactive visual interfaces for users to interact with data sets and visually explore the data.

SUMMARY

In a general aspect, visual analytics system includes a memory and a processor that are configured to execute a clustering application. An interactive user-interface of the clustering application is hosted on a client computer.

In one aspect, the clustering application determines a first cluster of data items of a data set. The data items in the first cluster have first attribute values that are similar to each other within a first degree of similarity. The first cluster of data items is represented by a first reference data item.

In a second aspect, the clustering application determines a second cluster of data items of a data set. The data items in the first cluster have second attribute values that are similar to each other within a second-degree of similarity. The second cluster of data items is represented by a second reference data item.

In a third aspect, the user interface receives a user selection of a third degree of similarity, and, in response, the clustering application determines a third cluster of data items of the data set such that the data items in the third cluster are dissimilar to either the first attribute value of the first reference data item or the second attribute value of the second reference data item by at least the third degree of similarity. The system visually displays the third cluster of data items of the data set on the user interface (e.g., as pictorial or descriptive icons).

In another aspect, the user interface includes an UI element for receiving a user selection of a first reference data item representing the first cluster of data items, and an UI element for receiving a user selection of the first degree of similarity.

In yet another aspect, the user interface includes a query interface for building user queries to retrieve data items from the dataset, and a visual display of the retrieved data items for user selection as the first reference data item.

The details of one or more implementations are set forth in the accompanying drawings and the description below. Further features of the disclosed subject matter, its nature and various advantages will be more apparent from the accompanying drawings the following detailed description, and the claims.

DETAILED DESCRIPTION

Clustering analysis is a statistical tool for data analysis. A data set may include data items having multiple dimensions or attributes. In cluster analysis, which may be viewed as an unsupervised learning technique, the data items may be grouped in clusters based on data similarity. In other words, data items with similar attribute values can be grouped in one cluster and data items having dissimilar attribute values can be grouped in other clusters. Data items in the data set are partitioned into groups called clusters that represent proximate collections of data items based on a distance or dissimilarity function. Identical data item pairs have zero distance or dissimilarity, and all others have positive distance or dissimilarity. Clustering algorithms form groupings or clusters in such a way that data items within a cluster have a higher measure of similarity than with data items in any other cluster. The measure of similarity on which the clusters are formed can be defined by Euclidean distance, probabilistic distance, or another metric. For convenience in description herein, a measure or degree of similarity also may be referred to herein as a "degree or distance" or a "degree of discrimination."

A data analytics application may use any of a number of different methods (e.g., a partitioning method, a hierarchical method, a density-based method, a grid-based method, a model-based method or a constraint-based method) for clustering data items. In a partitioning method, for example, a given number of partitions or groups of the data are created in an initial partitioning, each partition including a reference or center data item for the partition. Then, iterative relocation techniques may be used to improve the partitioning by moving data items from one group to other. In a density-based method, for example, the basic idea is to continue growing a given cluster as long as the density in the neighborhood exceeds some threshold i.e., for each data item within a given cluster, the radius of the given cluster has to contain at least a minimum number of points.

The data analytics application may present the clusters in a visual layout of data items in a chart or plot, for example, according to the largest density among items. Typically, this can be achieved only with respect to two dimensions or attributes at a time (e.g. in a two-dimensional chart of plot). While the displayed clusters may be mathematically distinct in the two displayed dimensions or attributes, the clusters may not be significantly different in other undisplayed dimensions or attributes. The undisplayed dimensions or attributes may be more relevant in forming informationally meaningful clusters (e.g., from the perspective or experience of a user) than the displayed dimensions.

A system and methods for visual exploration of data described herein may involve a data analytics application (e.g., a clustering application) that has interactive features to allow a user to participate in the data analytics (e.g., clustering), in accordance with the principle of the present disclosure.

Figure 1:
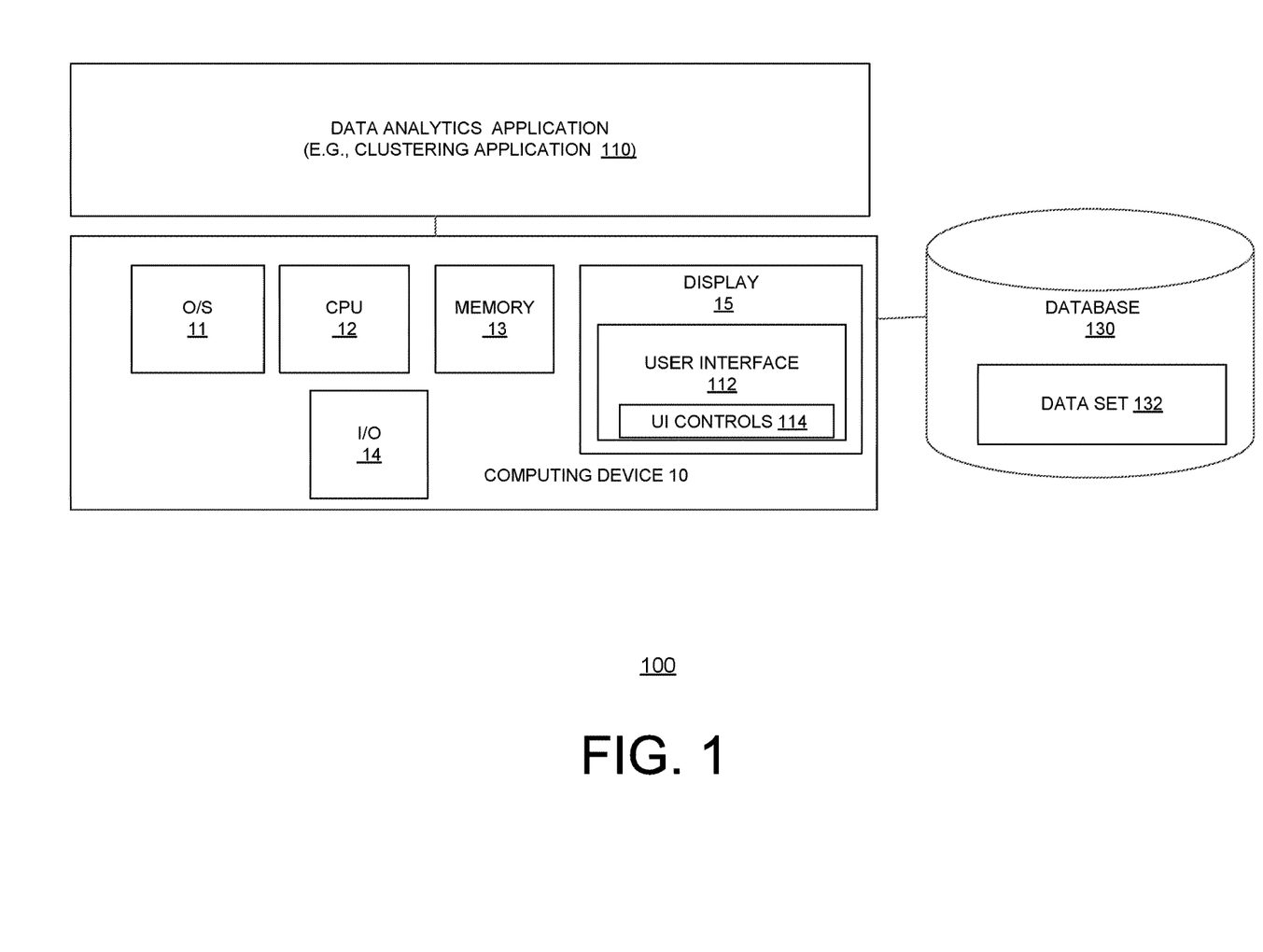
FIG. 1 is a block diagram illustration of an example computer-based system hosting a data analytics application with a user interface (UI) configured for visual exploration of data, in accordance with principles of the disclosure herein.

FIG. 1 shows an example system 100 in which a data analytics application (e.g., clustering application 110) is configured to visually display results (e.g., data clusters) on an interactive user interface, in accordance with the principles of the disclosure herein. The interactive user interface may be configured to allow user's to participate in the data analysis and visually explore of the data.

Clustering application 110 may include computational processes and clustering algorithms to find unique and definitive groupings of data as an aid for investigators to obtain qualitative and quantitative understanding of data (e.g., a large amount of multivariate data). In an example implementation, clustering application 110 may be used to query and cluster multivariate data that may be stored or accumulated, for example, in a data set 132 in a database 130. Clustering application 110 may render a chart or plot of the determined data clusters in a visual layout for a user to peruse or study as being representative of the structure of data set 132.

In system 100, clustering application 110 may be hosted on one or more standalone or networked physical or virtual computing machines. FIG. 1 shows clustering application 110 hosted, for example, on a computing device 10 (e.g., a desktop computer, mainframe computer, personal computer, mobile computing device, laptop, tablet, or smart phone), which may be available to a user. Computing device 10 may include an O/S 11, a CPU 12, a memory 13, an I/O 14, and a display 15.

Clustering application 110 may further include a front-end user interface (UI) 112, which may, for example, be rendered on display 15. Clustering application 110 may present a visual layout (e.g., a chart or plot) of the determined data clusters on UI 112. UI 112 may include user-activable UI elements or controls (e.g., UI controls 114) that may be configured to allow the user to interactively participate, for example, in defining the clusters for grouping of data items in dataset 132. A user may, for example, use UI controls 114 to interactively identify data items (or clusters) as reference data items, and or specify parameters (e.g., attributes and degrees of discrimination or distance) to form one or more clusters of data items that are most distinct from other defined clusters in terms of the specified parameters.

In an example implementation, a user-initiated clustering process (which may be referred to herein as "discriminative clustering") may involve using UI controls 114 to specify parameters (e.g., attributes and degrees of discrimination or distance) of the clusters that are visually displayed on user interface 112, in accordance with the principles of the present disclosure.

Figure 2:
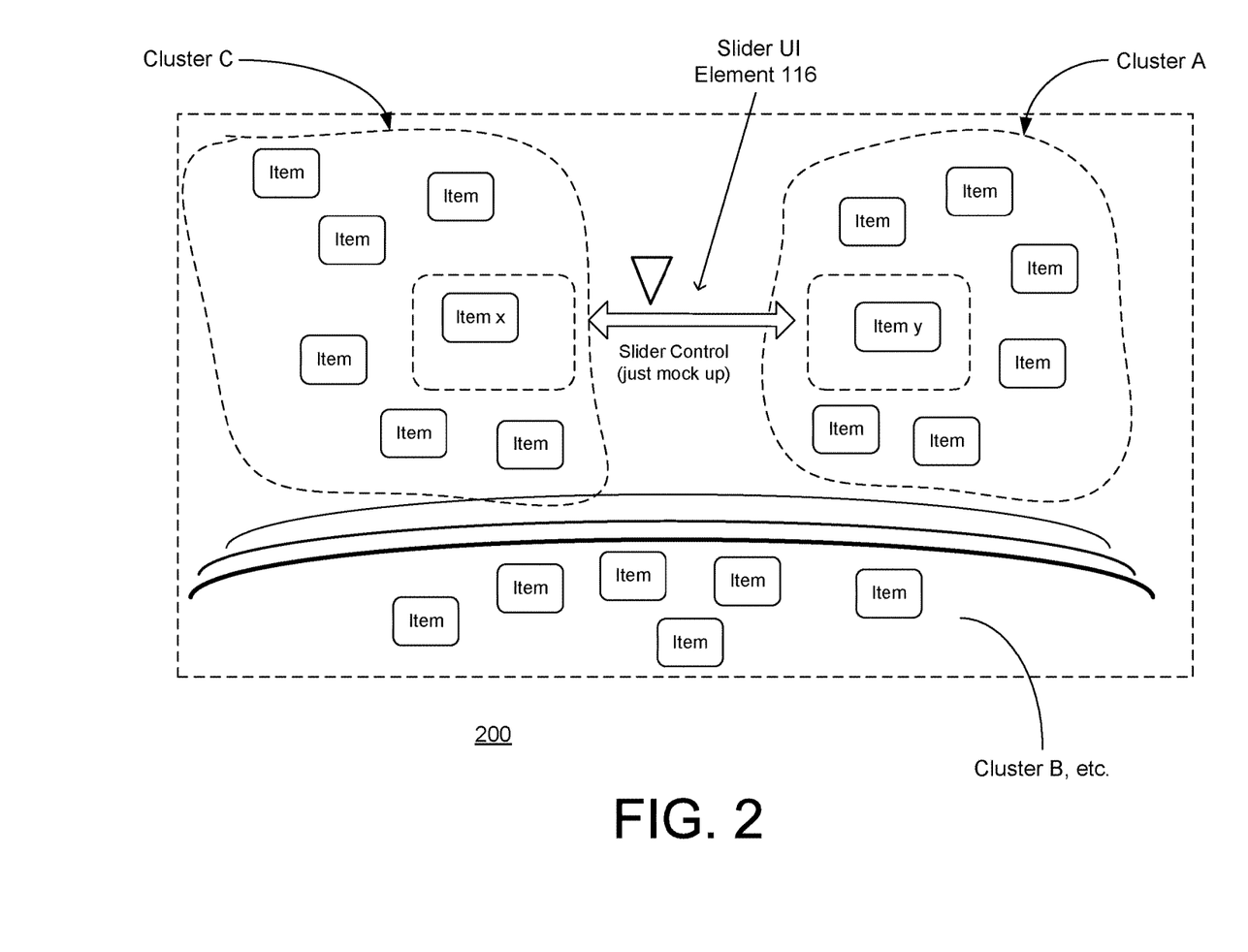
FIG. 2 is a schematic illustration of an example interactive visual display of data clusters that may be rendered on the user interface of FIG. 1, in accordance with the principles of the present disclosure.

FIG. 2 shows an example interactive visual display 200 of data clusters (e.g., cluster C, cluster A, cluster B, etc.) that may be rendered on UI 112 by application 110. A user may use controls 114 to specify in which respect or attribute a distinctive cluster (e.g., cluster C) should be different from the other clusters (e.g., cluster A, cluster B, etc.), in accordance with the principles of the present disclosure. The user may, for example, specify that data items in cluster A should differ from data items in distinctive cluster C in terms of aspect or attribute X, and data items in distinctive cluster C should differ from data items in cluster B in terms of aspect or attribute Y. Moreover, the user may indicate the degrees of separation (i.e., distance) by which cluster C should differ from either cluster A or B, respectively. In the example shown, the user may use controls 114 to identify reference data items (e.g., item x in cluster C, and item y in cluster A) that application 110 may use as reference for retrieving or building the clusters (e.g., cluster C and cluster A, respectively). Further, controls 114 may, for example, include a slider UI element 116 which may allow the user to indicate the desired degree of separation or distance between the distinctive clusters (e.g., cluster C, cluster A, cluster B, etc.) on an analog scale. If a high degree of separation or distance is indicated, it may be expected that fewer data items will be retrieved as part of cluster C by application 110 compared to the number of data items retrieved as part of cluster C when a low degree of separation or distance is indicated.

Figure 3:
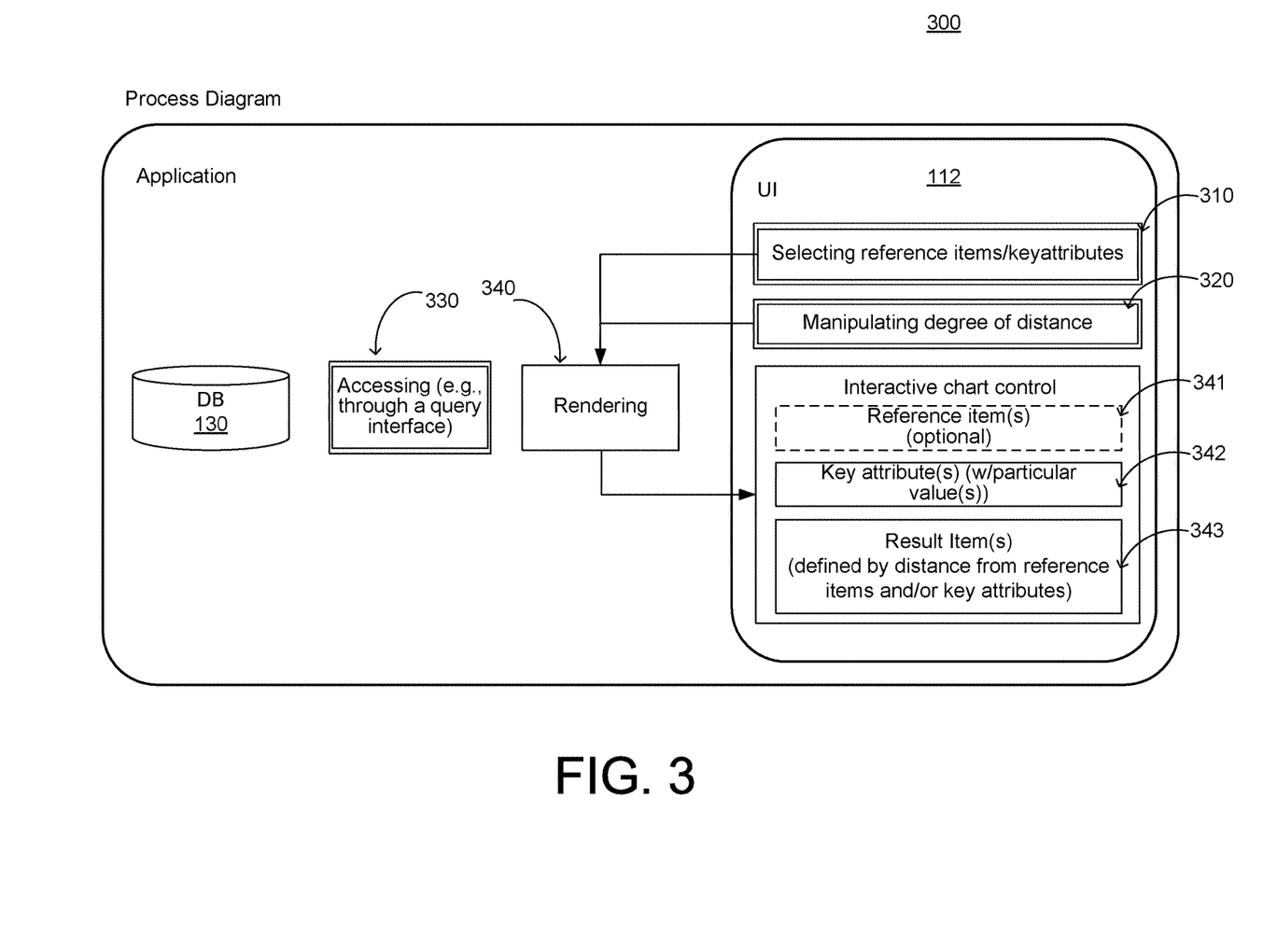
FIG. 3 is a schematic diagram illustrating an example implementation of an interactive visual analytics method for discriminative clustering of data in conjunction with the application and system of FIG. 1, in accordance with the principles of the present disclosure.

FIG. 3 is a schematic diagram illustrating an example implementation of an interactive visual analytics method 300 for discriminative clustering of data (e.g., data items in dataset 132) in conjunction with application 110 and system 100 of FIG. 1, in accordance with the principles of the present disclosure. Application 110 may include clustering algorithms or processes, and include processes for visual rendition of the results on UI 112. The results that are visually rendered on UI 112 may include one or more of reference data items 341, identifications of key attributes and key attribute values 342, and cluster of data items (which may be selected based on distance from the reference data items and/or key attributes) 343. The data items may be shown as pictorial icons on UI 112.

Method 300 for discriminative clustering of data may include user input actions at the front end user interface 112 of application 110. The user input actions may include selecting reference data items and key attributes of the data items for forming data item clusters (310), and manipulating or indicating the degree of distance of the data items within a data item cluster or the degree of distance from another data item cluster (320). In method 300, the user input actions may further include accessing or querying data items (e.g., in dataset 132) in database 130 via a query interface of application 110 (e.g., user interface 112) to identify or retrieve data items for application 110 to process (330).

Method 300 further involves application 110, in response to the user input actions (e.g., 310-330), clustering the data items according to the specified degrees of distance and rendering the results in an interactive visual display on user interface 112. The results displayed on user interface 112 may include the selected reference data items, the selected key attributes of the data items, values of the selected key attributes, and or the processed data item clusters (which may be processed by application 110 according to the specified degrees of distance). An example of the results that may be displayed on user interface 112 was previously shown in FIG. 2.

Figure 4:
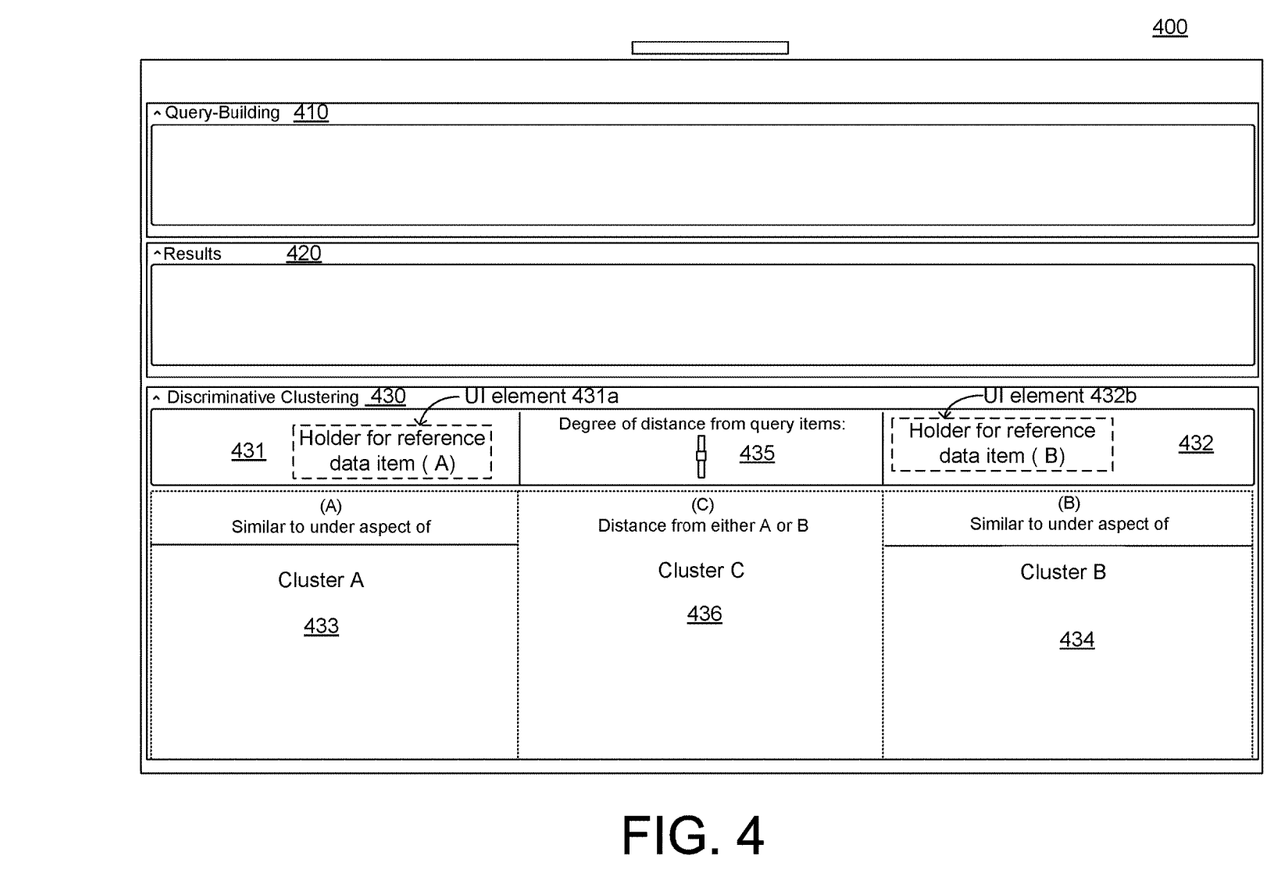
FIG. 4 is an illustration of an example configuration of a user interface and UI controls, in accordance with the principles of the present disclosure.

FIG. 4 shows an example configuration of user interface 112 and UI controls 114 (which are relabeled as UI 400, for convenience in reference herein) that may be used in system 100 for performing method 300, in accordance with the principles of the present disclosure.

User interface 400 may include a query building panel 410 and a query results display panel 420. User interface 400 may also include a discriminative clustering panel 430, which includes reference data item display panels (e.g., panels 431 and 432) for user specification of reference data items, and corresponding data items cluster panels (e.g., panels 433 and 434) for displaying data clusters (e.g., clusters A and B, respectively) corresponding to the specified reference data items. Panels 431 and 432 may include user-activable UI element 431a and 432b, respectively, that may be used to identify the reference data items and to specify the attributes of the reference data items for the forming the respective clusters (e.g., clusters A and B, respectively).

Discriminative clustering panel 430 may also include a UI element (e.g., slider UI element 435) for receiving user specification of a "degree of distance" parameter for discriminatively clustering data items and a display panel 436 for displaying a corresponding data items cluster (e.g., cluster C).

Example "Car Rental Company Inventory Records" Use Case.

In an example use case, the data items in data set 132 may be the car inventory records of a car rental company. The car rental company may have a large inventory of diverse cars that it rents out to customers for hire at diverse car rental locations. Each car inventory record or data item in data set 132 may have multiple attributes (e.g., car identification, car brand, odometer mileage reading, fuel economy, number of car seats, trunk capacity, etc.) characterizing the car. A user may want to visually explore data set 132, for example, to determine the availability of a preferred type of car for rent to a customer, and if a preferred type of car is not available, determine the availability of car types similar to the preferred car type for rent to the customer. For this purpose, the user may use method 300 in conjunction with system 100 and UI 400 for discriminative clustering to determine the availability of car types similar to the preferred type for rent to the customer.

For convenience in illustration, further aspects of the use of method 300 and UI 400 for visual analytics and discriminative clustering are described herein in the context of the foregoing "Car rental company inventory records" use case.

Figure 5:
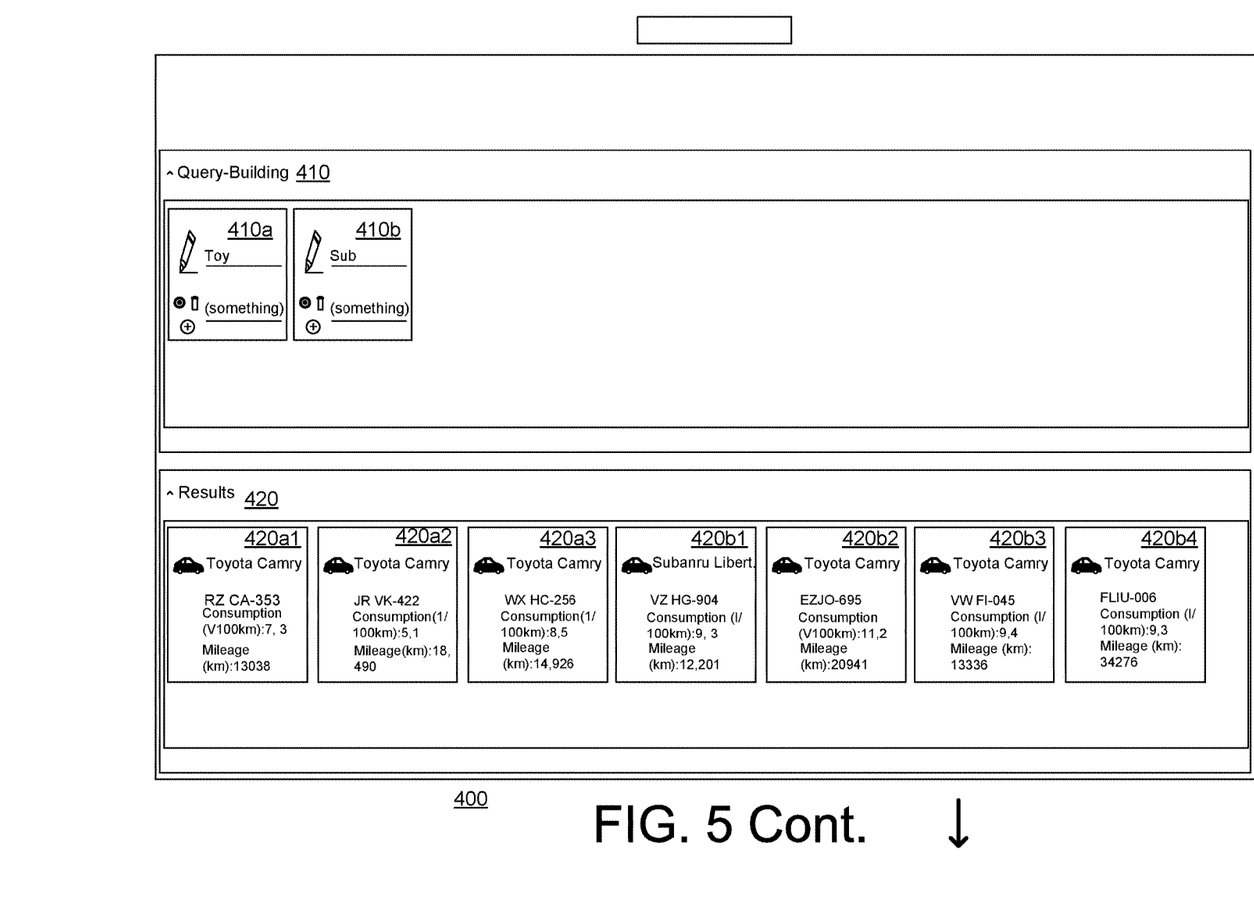
FIG. 5 is a schematic illustration of example components of the user interface of FIG. 4, in accordance with the principles of the present disclosure.

FIG. 5 schematically shows example components and elements of UI 400, in accordance with the principles of the present disclosure.

FIG. 5 shows query building panel 410 of UI 400 may, for example, include one or more query input elements (e.g., query template 410a and query template 410b) to construct queries (e.g., SQL queries). These queries may be used by the user to access data set 132 and retrieve, for example, data items that can be used as reference data items for building clusters (e.g., cluster A and cluster B). In the example shown in FIG. 5, query template 410a may be written to retrieve data items having a brand attribute "TOY[OTA]", and query template 410b may be written to retrieve data item records having a brand attribute "SUB[ARU]." Results of the queries (e.g., data items 420a1-420a3 having a brand attribute "TOYOTA", and data items 420b1-420b4 having a brand attribute "SUBARU") may be visually displayed in results panel 420 of UI 400 for the user's perusal.

The user may select one or more of the query results (e.g., data items 420a1-420a3 or data items 420b1-420b4) for use as reference data items of clusters in discriminative clustering panel 430. The user may, for example, select data item 420a1 and data item 420b2 to be used as reference data items of clusters A and B, respectively, in discriminative clustering panel 430.

FIG. 5 further shows, for example, data item 420a1 and data item 420b2 placed in (e.g., by a drag and drop operation) in user-activable UI element 431a and 432b, respectively, to identify the reference data items of the respective clusters (e.g., clusters A and B, respectively). Further, user-activable UI element 431a and 432b may include, for example, attribute selector buttons 431aa and 432bb, respectively, for specifying the clustering attributes (e.g., (fuel) "Consumption" or (odometer) "Mileage") of the reference data items of the respective clusters (e.g., clusters A and B, respectively).

Figure 6:
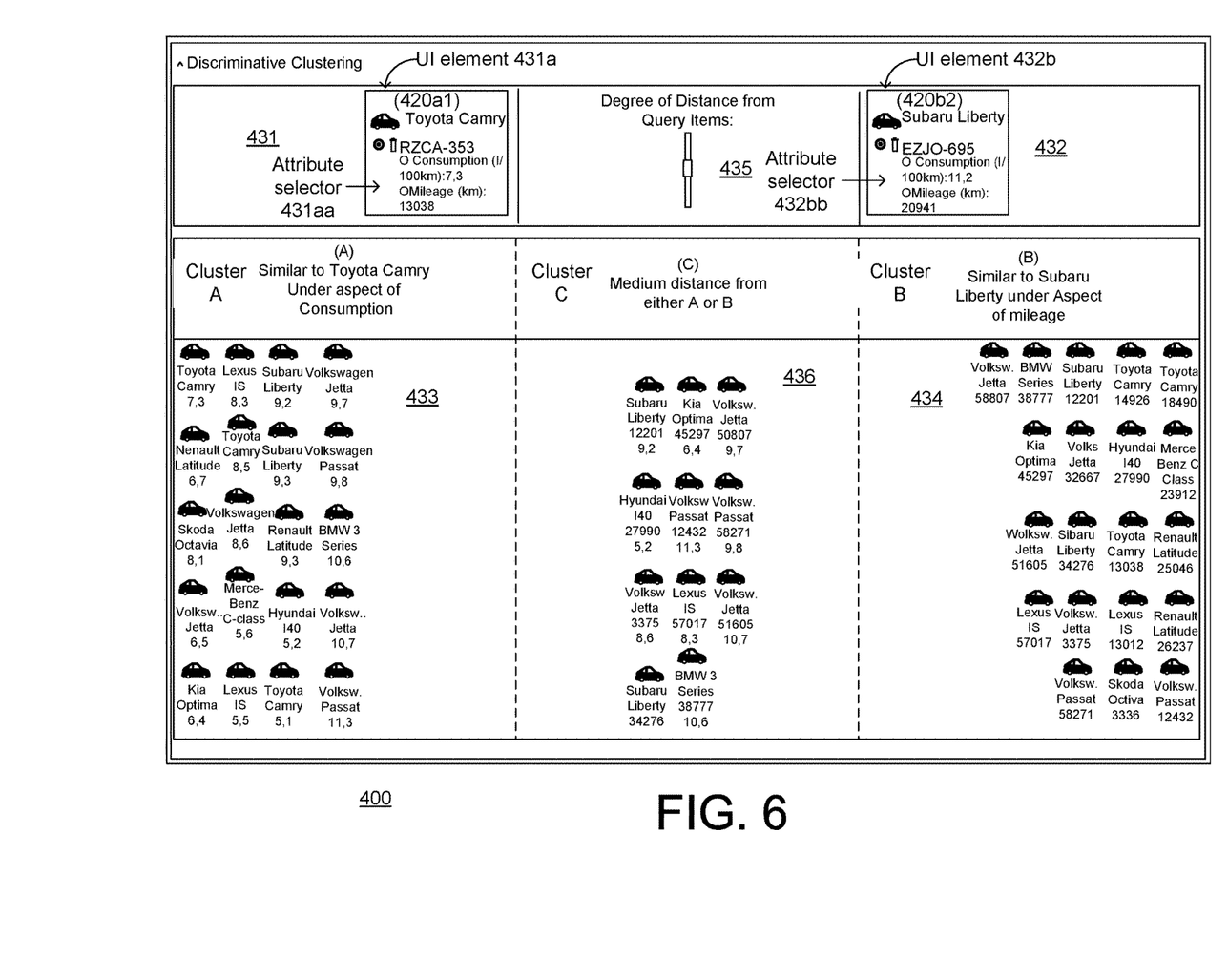
FIG. 6 is a schematic illustration of an instance of the use of attribute selector buttons to select attributes of reference data items for forming clusters, and use of a slider UI element to set a degree of distance for forming a discriminative cluster, in accordance with the principles of the present disclosure.

FIG. 6 shows, for example, an instance in which the user may have (using attribute selector buttons 431aa and 432bb) specified the attribute Consumption and the attribute Mileage of the reference data items 420a1 and 420b2 for forming clusters A and B, respectively, in accordance with the principles of the present disclosure.

After the clustering attribute Consumption is specified in UI element 431a, application 110 may process the data items in data set 132 to identify or form cluster A of data items that are similar to data item 420a1 in respect to the Consumption attribute. The data items (and associated Consumption attribute values) in cluster A may be visually displayed in panel 433 in UI 132 for the user's visual exploration. Similarly, after the clustering attribute Mileage is specified in UI element 432b, application 110 may process the data items in data set 132 to identify cluster B of data items that are similar to data item 420b2 in respect to the Mileage attribute. The data items (and associated Mileage attribute values) in cluster B may be visually displayed in panel 434 in UI 132 for the user's visual exploration.

It will be noted that the data items in Cluster A and Cluster B being similar to different reference attributes (e.g., Consumption and Mileage, respectively), may show overlapping, partially overlapping, or non-overlapping sets of data items, and or may show same data items that are ordered or ranked differently in Cluster A and Cluster B. There may not be a data item (car) with both the best fuel consumption and also best odometer mileage compared to the reference data items (e.g., data element 420*a*1 or data element 420*b*2) of clusters A and B. In the course of the visual exploration of the data items, the user may, for example, further want to see common data items in clusters A and B that are the least dissimilar (or the most dissimilar) to either of the reference data items (e.g., data element 420*a*1 or data element 420*b*2) of clusters A and B, respectively.

For this purpose, the user may use slider UI element 435 in discriminative clustering panel 430 to specify of a "degree of distance" parameter for discriminatively clustering the data items. FIG. 6 shows slider UI element 435 set, for example, at about midway on the slider corresponding to a medium distance from either cluster A or cluster B. Application 110 processes may determine which data items have a medium degree of distance from the reference data items (e.g., data items 420*a*1 and 420*b*2) of cluster A and cluster B, and visually display these data items (and associated attribute values) as a discriminative cluster (e.g. cluster C) on panel 436 of UI 112 for the user's visual exploration.

Figure 7:
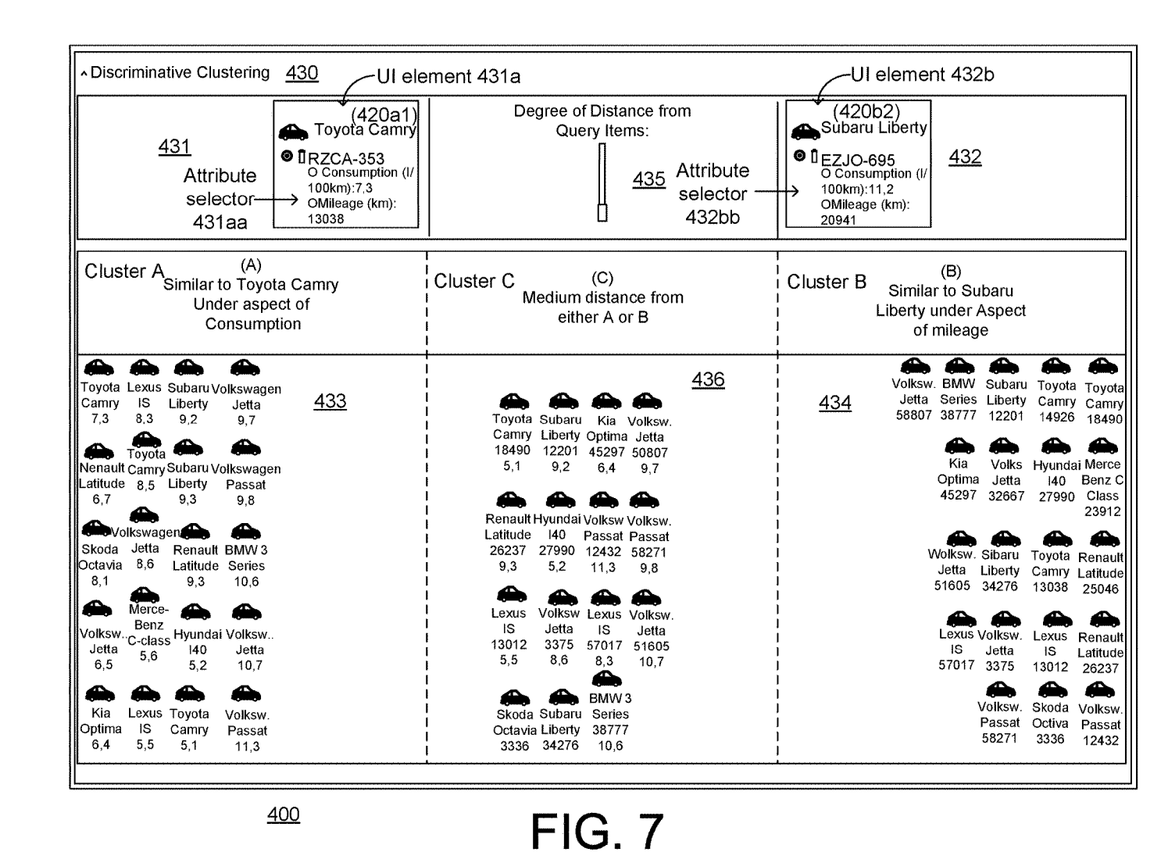
FIG. 7 is a schematic illustration of an instance of the use of a slider UI element to display a discriminative cluster having a low degree of distance from reference data items, in accordance with the principles of the present disclosure.

The user may use slider UI element 435 in discriminative clustering panel 430 to view discriminative clusters corresponding to other degrees of distance. For example, for the same clusters A and B of FIG. 6, FIG. 7 shows the slider UI element 435 as being set at about the low end on the slider corresponding to a low distance from the reference data items of either cluster A or cluster B. Application 110 processes may determine which data items have a low degree of distance from the reference data items of cluster A and cluster B, and visually display these data items (and associated attribute values) as a discriminative cluster (e.g. cluster C) on panel 436 of UI 112 for the user's visual exploration. As may be expected, cluster C in FIG. 7 corresponding to a low degree of distance includes more data items than cluster C in FIG. 6 corresponding to a medium degree of distance.

Figure 8:
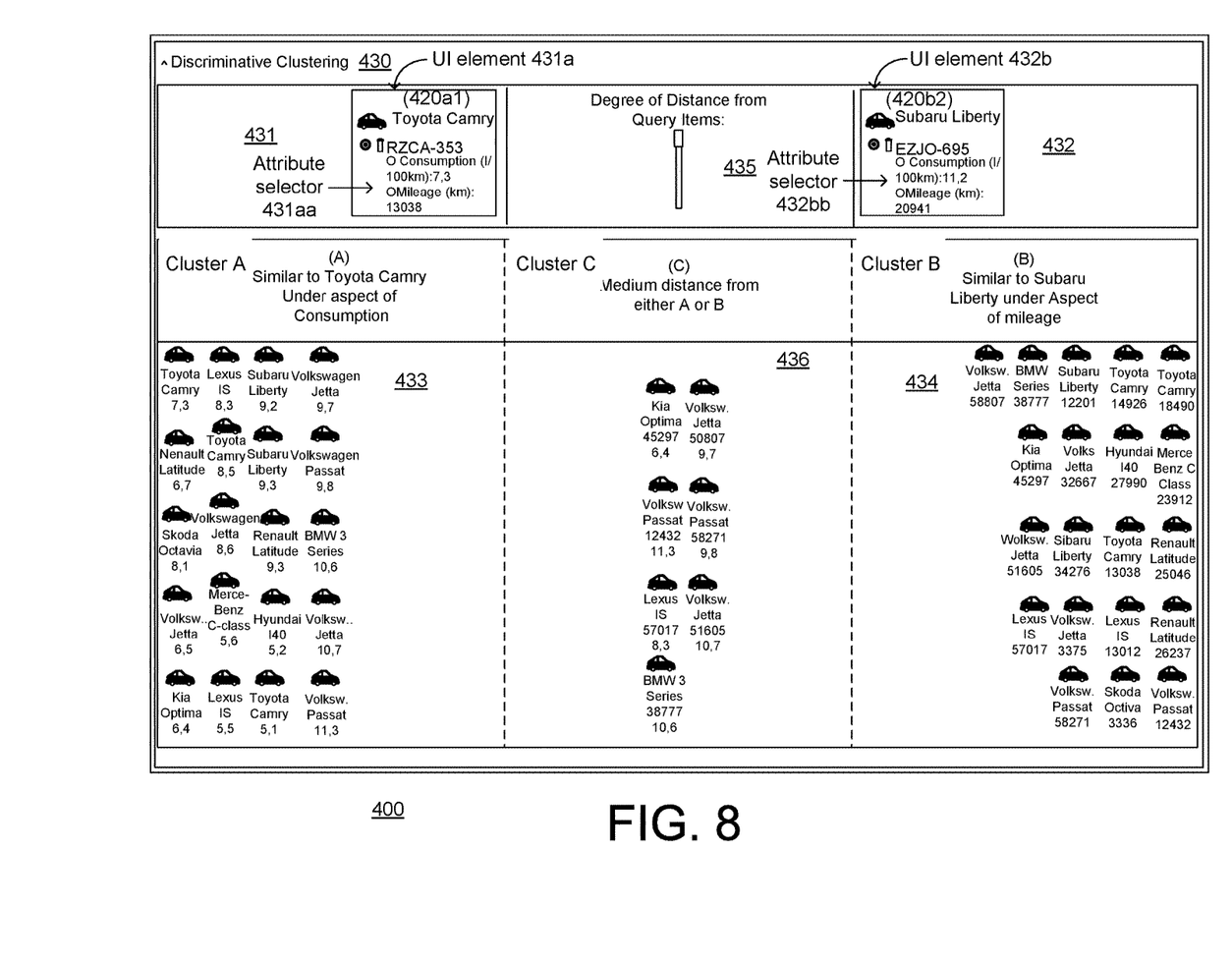
FIG. 8 is a schematic illustration of an instance of the use of a slider UI element to display a discriminative cluster having a high degree of distance from reference data items, in accordance with the principles of the present disclosure.

Similarly, for example, for the same clusters A and B of FIG. 6 and FIG. 7, FIG. 8 shows the slider UI element 435 as being set at about the high end on the slider corresponding to a high distance from the reference data items of either cluster A or cluster B. Application 110 processes may determine which data items have a high degree of distance from the reference data items of cluster A and cluster B, and visually display these data items (and associated attribute values) as a discriminative cluster (e.g. cluster C) on panel 436 of UI 112 for the user's visual exploration. As may be expected, cluster C in FIG. 8 corresponding to a high degree of distance includes fewer data items than cluster C in FIG. 6 corresponding to a medium degree of distance.

In addition to visually exploring the data items by using different settings of the degree of distance on slider UI element 435, the user can also further explore data set 132 by changing the specification of the clustering attribute (e.g., Consumption or Mileage) of the reference data items to be used for forming the respective clusters (e.g., clusters A and B, respectively).

Figure 9:
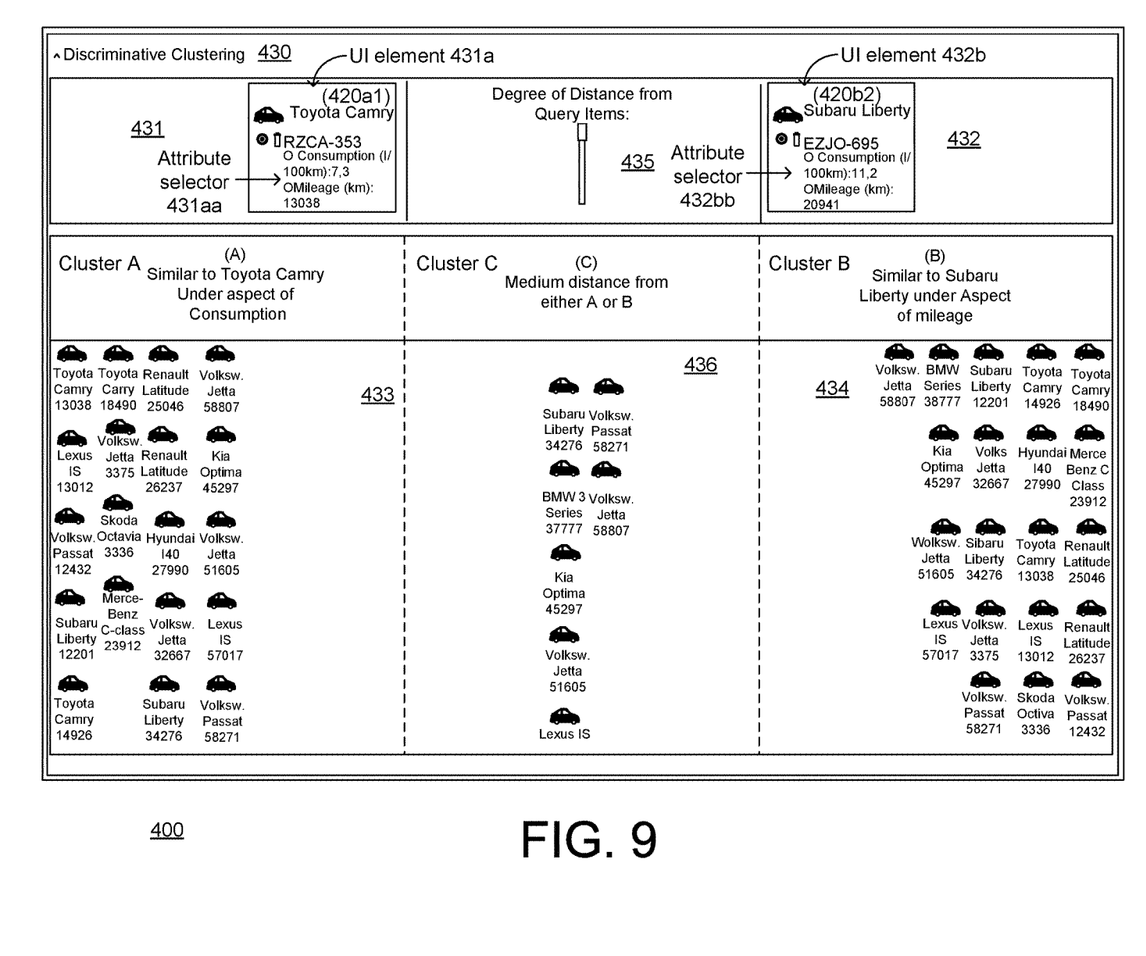
FIG. 9 is a schematic illustration of an instance of switching an attribute selector button to select a new attribute of a reference data item for forming a cluster, in accordance with the principles of the present disclosure.

FIG. 9 shows, for example, an instance in which attribute selector button 431*aa* has been switched to select Mileage as the attribute of the reference data item for forming cluster A (compared to the selection in FIG. 8 of Consumption as the reference data item attribute for forming cluster A). In response, application 110 may automatically update the data items of cluster A and cluster C displayed on UI 112 for the users perusal, based on the new selection of Mileage as the attribute of the reference data item for forming cluster A.

Figure 10:
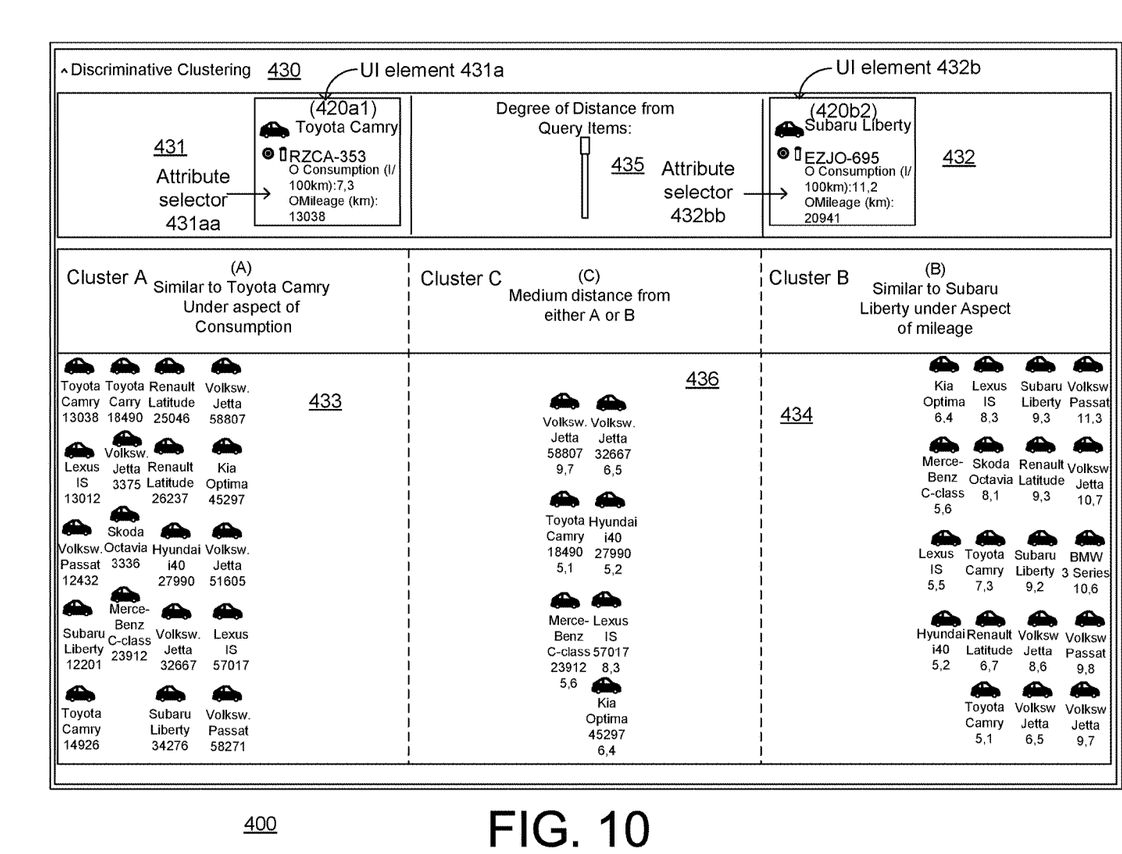
FIG. 10 is a schematic illustration of another instance of switching an attribute selector button to select a new attribute of a reference data item for forming a cluster, in accordance with the principles of the present disclosure.

Similarly, FIG. 10 shows, for example, an instance in which attribute selector button 432*bb* has been switched to select Consumption as the attribute of the reference data item for forming cluster B (compared to the selection in FIG. 9 of Mileage as the attribute of the reference data item for forming cluster B). In response, application 110 may automatically update the data items of cluster B and cluster C displayed on UI 112 for the user's perusal, based on the new selection of Consumption as the attribute of the reference data item for forming cluster B.

It will be noted that the example implementation of the discriminative clustering technique for visual exploration of data described in the foregoing (e.g., with reference to FIGS. 1-10), the discriminative cluster (e.g., cluster C) is determined by the distance of data items from two reference data items or clusters (e.g., cluster A and cluster B). In other implementations of the discriminative clustering technique for visual exploration of data, consistent with the principles of the present disclosure, one or more discriminative clusters (e.g., cluster C, etc.) may be determined by the distance of data items from more than two reference data items or clusters (e.g., cluster A, cluster B, cluster X, cluster Y, etc.).

It will be further noted that the discriminative clustering technique described in the foregoing (e.g., with reference to FIGS. 1-0) can be used to identify and visually identify outliers in data. In a traditional data plot (e.g., a 2-dimensional scatter plot) it is difficult to visualize an outlier while maintaining the visibility of the high density of the main distribution of data (e.g., because the outlier may be far off from the main distribution of data, and may not fit on the scale of the data plot). In example implementations of outlier analysis using method 300 and system 100, the main data distribution may be visually displayed, for example, as cluster A or cluster B on UI 112. The outlier data may be identified or extracted by discriminative clustering (e.g., by setting the degree of distance on slider UI element 435 to high) and visually displayed in separate cluster C on UI 112 on the same or similar scale as the main data distribution (e.g., cluster A or cluster B).

A non-transitory computer readable medium may bear instructions capable of being executed on a processor, which instructions when executed may allow creation of a UI instance on a frontend of a clustering application hosted on a particular computing platform or device. The UI instance may use UI components or elements that are specifically supported by particular computing platform or device on which the business application is hosted.

The various systems and techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output.

Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for visual analytics of multi-attribute data items in a data set, the method comprising:
   providing an interactive user interface to a clustering application hosted on a computer;
   determining, by the clustering application, a first cluster of data items of a data set, the data items in the first cluster having first attribute values that are similar to each other within a first degree of similarity, the first cluster of data items being represented by a first reference data item;
   determining, by the clustering application, a second cluster of data items of the data set, the data items in the second cluster having second attribute values that are similar to each other within a second degree of similarity, the second cluster of data items being represented by a second reference data item;
   receiving, on the user interface, a user selection of a third degree of similarity;
   determining a third cluster of data items of the data set, the data items in the third cluster being dissimilar to either the first attribute value of the first reference data item or the second attribute value of the second reference data item by at least the third degree of similarity; and
   visually displaying the first, second, and third clusters of data items of the data set on the user interface.

2. The method of claim 1, wherein visually displaying the third cluster of data items of the data set on the user-interface includes representing the data items by pictorial icons on the user interface.

3. The method of claim 1, wherein determining the first cluster of data items of the data set includes receiving, on the user interface, a user selection of a first reference data item representing the first cluster of data items.

4. The method of claim 1, further comprising:
   providing a query interface for user queries to retrieve data items from the dataset; and
   visually displaying the retrieved data items on the user interface for user selection as the first reference data item.

5. The method of claim 1, wherein determining the first cluster of data items of the data set includes receiving, on the user interface, a user selection of the first degree of similarity.

6. The method of claim 1, wherein determining the first cluster of data items of the data set includes receiving, on the user interface, a user identification of the first attribute for determining similarity of the data items in the first cluster to each other within a first degree of similarity.

7. The method of claim 1, wherein the first, second, and third clusters of data items of the data set are visually displayed in a first, second, and third areas on the user interface, respectively, and wherein the first, second, and third areas are three non-overlapping areas on the user interface.

8. A visual analytics system, comprising:
   a memory; and
   a processor configured to execute a clustering application having an interactive user-interface hosted on a client computer;
   wherein the clustering application determines a first cluster of data items of a data set, the data items in the first cluster having first attribute values that are similar to each other within a first degree of similarity, the first cluster of data items being represented by a first reference data item;
   wherein the clustering application determines a second cluster of data items of the data set, the data items in the second cluster having second attribute values that are similar to each other within a second degree of similarity, the second cluster of data items being represented by a second reference data item;
   wherein the user interface receives a user selection of a third degree of similarity; and
   wherein the clustering application determines a third cluster of data items of the data set, the data items in the third cluster being dissimilar to either the first attribute value of the first reference data item or the second attribute value of the second reference data item by at least the third degree of similarity, and visually displays the first, second, and third clusters of data items of the data set on the user interface.

9. The visual analytics system of claim 8, wherein visually displaying the third cluster of data items of the data set on the user-interface includes representing the data items by pictorial icons on the user interface.

10. The visual analytics system of claim 8, wherein the user interface includes an UI element for receiving a user selection of a first reference data item representing the first cluster of data items.

11. The visual analytics system of claim 8, wherein the user interface includes:
 a query interface for building user queries to retrieve data items from the dataset; and
 a visual display of the retrieved data items for user selection as the first reference data item.

12. The visual analytics system of claim 8, wherein the user interface includes an UI element for receiving a user selection of the first degree of similarity.

13. The visual analytics system of claim 8, wherein the user interface includes an UI element for receiving a user identification of the first attribute for determining similarity of the data items in the first cluster to each other within the first degree of similarity.

14. The visual analytics system of claim 13, wherein the UI element for receiving the user identification of the first attribute is configured to permit user switching of a previous identification of the first attribute to identification of a different attribute for determining similarity of the data items in the first cluster to each other within the first degree of similarity.

15. A non-transitory computer readable medium comprising:
 instructions capable of being executed on a processor, which instructions when executed allow a computing device to:
 provide an interactive user interface on a client device to a clustering application;
 wherein the clustering application determines a first cluster of data items of a data set, the data items in the first cluster having first attribute values that are similar to each other within a first degree of similarity, the first cluster of data items being represented by a first reference data item;
 wherein the clustering application determines a second cluster of data items of the data set, the data items in the second cluster having second attribute values that are similar to each other within a second degree of similarity, the second cluster of data items being represented by a second reference data item;
 wherein the user interface receives a user selection of a third degree of similarity; and
 wherein the clustering application determines a third cluster of data items of the data set, the data items in the third cluster being dissimilar to either the first attribute value of the first reference data item or the second attribute value of the second reference data item by at least the third degree of similarity, and visually displays the first, second, and third clusters of data items of the data set on the user interface.

16. The non-transitory computer readable medium of claim 15, wherein visually displaying the third cluster of data items of the data set on the user-interface includes representing the data items by pictorial icons on the user interface.

17. The non-transitory computer readable medium of claim 15, wherein the user interface includes an UI element for receiving a user selection of a first reference data item representing the first cluster of data items.

18. The non-transitory computer readable medium of claim 15, wherein the user interface includes:
 a query interface for building user queries to retrieve data items from the dataset; and
 a visual display of the retrieved data items for user selection as the first reference data item.

19. The non-transitory computer readable medium of claim 15, wherein the user interface includes an UI element for receiving a user selection of the first degree of similarity.

20. The non-transitory computer readable medium of claim 15, wherein the user interface includes an UI element for receiving a user identification of the first attribute for determining similarity of the data items in the first cluster to each other within the first degree of similarity.

\* \* \* \* \*